US011260797B2

(12) United States Patent
Norris

(10) Patent No.: US 11,260,797 B2
(45) Date of Patent: Mar. 1, 2022

(54) RETRACTABLE VEHICLE STEP ASSEMBLIES AND METHODS

(71) Applicant: Toyota Motor Engineering & Manufacturing North America, Inc., Plano, TX (US)

(72) Inventor: Justin B. Norris, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 375 days.

(21) Appl. No.: 16/217,763

(22) Filed: Dec. 12, 2018

(65) Prior Publication Data

US 2020/0189473 A1 Jun. 18, 2020

(51) Int. Cl.
*B60R 3/02* (2006.01)
*F16H 21/44* (2006.01)

(52) U.S. Cl.
CPC .............. *B60R 3/02* (2013.01); *F16H 21/44* (2013.01)

(58) Field of Classification Search
CPC .......... B60R 3/02; B60R 3/002; B61D 23/02; B61D 23/025; F16D 1/0852; F16D 2001/103
See application file for complete search history.

(56) References Cited

U.S. PATENT DOCUMENTS

| | | | | |
|---|---|---|---|---|
| 4,249,634 A * | 2/1981 | Potts | ......................... | B60R 3/02 182/1 |
| 4,275,664 A * | 6/1981 | Reddy | .................. | B61D 23/025 105/426 |
| 4,623,160 A * | 11/1986 | Trudell | ..................... | B60R 3/02 182/127 |
| 5,816,113 A * | 10/1998 | Fohl | .......................... | B62D 1/04 74/552 |
| 6,234,907 B1 * | 5/2001 | Moser | ...................... | F16D 1/112 464/134 |
| 6,367,351 B2 * | 4/2002 | Hosoi | ................... | B60R 21/203 280/777 |
| 6,942,233 B2 * | 9/2005 | Leitner | .................. | B60R 3/002 105/447 |
| 6,955,370 B2 * | 10/2005 | Fabiano | .................. | B60R 3/002 280/163 |

(Continued)

FOREIGN PATENT DOCUMENTS

| | | |
|---|---|---|
| CA | 2438489 C | 11/2010 |
| EP | 197873 B1 | 6/1990 |
| EP | 3266654 A1 | 1/2018 |

*Primary Examiner* — Emma K Frick
(74) *Attorney, Agent, or Firm* — Dinsmore & Shohl LLP

(57) ABSTRACT

A retractable vehicle step assembly includes a drive shaft having a spline and a step coupled to the drive shaft through a step linkage system. The step is moveable between an extended position and a retracted position. The step linkage system includes a first step linkage defining a spline engagement opening for engagement with the spline of the drive shaft and a fastener. The fastener is adjustably coupled to the first step linkage so as to clamp the spline engagement opening of the first step linkage around the drive shaft. Upon loosening the fastener, the first step linkage is disengageable from the drive shaft and the step is moveable from the extended position to the retracted position regardless of rotation of the drive shaft.

7 Claims, 5 Drawing Sheets

(56) References Cited

U.S. PATENT DOCUMENTS

| | | | | |
|---|---|---|---|---|
| 7,163,221 | B2 * | 1/2007 | Leitner | B60R 3/02 |
| | | | | 105/444 |
| 7,287,771 | B2 * | 10/2007 | Lee | B60R 3/002 |
| | | | | 280/163 |
| 7,367,574 | B2 * | 5/2008 | Leitner | B60R 3/02 |
| | | | | 280/163 |
| 7,584,975 | B2 * | 9/2009 | Leitner | B60R 3/02 |
| | | | | 280/163 |
| 7,891,902 | B2 * | 2/2011 | Pettey | F16C 3/00 |
| | | | | 403/313 |
| 8,042,820 | B1 * | 10/2011 | Dewees | B60R 3/02 |
| | | | | 280/166 |
| 8,056,913 | B2 * | 11/2011 | Kuntze | B60R 3/02 |
| | | | | 280/166 |
| 9,669,767 | B2 * | 6/2017 | Du | B60R 3/02 |
| 10,077,016 | B2 * | 9/2018 | Smith | B60R 19/48 |
| 10,246,018 | B1 * | 4/2019 | Chen | B60D 1/58 |
| 10,427,607 | B2 * | 10/2019 | Otacioglu | B60R 3/02 |
| 10,618,472 | B2 * | 4/2020 | Du | B60R 3/002 |
| 2017/0036607 | A1 | 2/2017 | Du et al. | |

* cited by examiner

RETRACTABLE VEHICLE STEP ASSEMBLIES AND METHODS

TECHNICAL FIELD

The present specification generally relates to retractable vehicle step assemblies and methods for stowing the retractable vehicle step assemblies and, more specifically, a retractable vehicle step assembly and method of stowing the retractable vehicle step assembly when a motor of the retractable vehicle step assembly is unable to move the retractable vehicle step assembly into a stowed position.

BACKGROUND

Vehicles may include steps to allow for easier access to a portion of the vehicle. For example, a bed of a truck or a passenger cabin may at times be difficult to access for those with limited height or mobility. A step may be attached to the vehicle to allow for easier access to these areas. Due to clearance requirements while driving it may be beneficial to retract the step to a position wherein it is tucked up underneath the vehicle. A motor may be used to move the step from an extended position wherein the step is positioned to allow a user to step on it to a retracted position, wherein the step is stowed underneath the vehicle. In some cases, the motor may become inoperable while the step is in an extended position, which may make driving the vehicle more difficult as the width of the vehicle may be increased. Ground clearance may also be reduced when driving with the step in the extended position, which may lead to damage to the step and/or the vehicle.

Accordingly, a need exists for alternative retractable vehicle step assemblies and methods for stowing retractable vehicle step assemblies that allows a user to manually stow the vehicle step assemblies when a motor of the vehicle step assembly become inoperable.

SUMMARY

In one embodiment, a retractable vehicle step assembly includes a drive shaft having a spline and a step coupled to the drive shaft through a step linkage system. The step is moveable between an extended position and a retracted position. The step linkage system includes a first step linkage defining a spline engagement opening for engagement with the spline of the drive shaft and a fastener. The fastener is adjustably coupled to the first step linkage so as to clamp the spline engagement opening of the first step linkage around the drive shaft. Upon loosening the fastener, the first step linkage is disengageable from the drive shaft and the step is moveable from the extended position to the retracted position regardless of rotation of the drive shaft.

In another embodiment, a method of stowing a retractable vehicle step assembly in a retracted position includes removing a fastener from a first step linkage, the first step linkage operatively coupling a step to a drive shaft through a splined engagement, pushing the step from an extended position to the retracted position, engaging the first step linkage with the drive shaft, and reinserting the fastener into the first step linkage to hold the step in the retracted position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The figures illustrate a retractable vehicle step assembly and a method of stowing a retractable vehicle step assembly. Retractable vehicle step assemblies as described herein may include a drive shaft having a spline and a step coupled to the drive shaft through a step linkage system. The step linkage system may include a first step linkage that may engage the splined shaft so as to interlock with the splined shaft. A fastener may clamp the first step linkage onto the splined drive shaft. When the fastener is removed, the first step linkage may be disengaged from the drive shaft so that the step may be moved to or from a retracted position regardless of the motion of the drive shaft. Accordingly, if the drive shaft were to become inoperable (e.g., due to motor failure) the step may be placed into the retracted (or stowed) position such that the vehicle may travel without concern for any additional clearance needed when the step is extended to an extended position.

Figure 1:
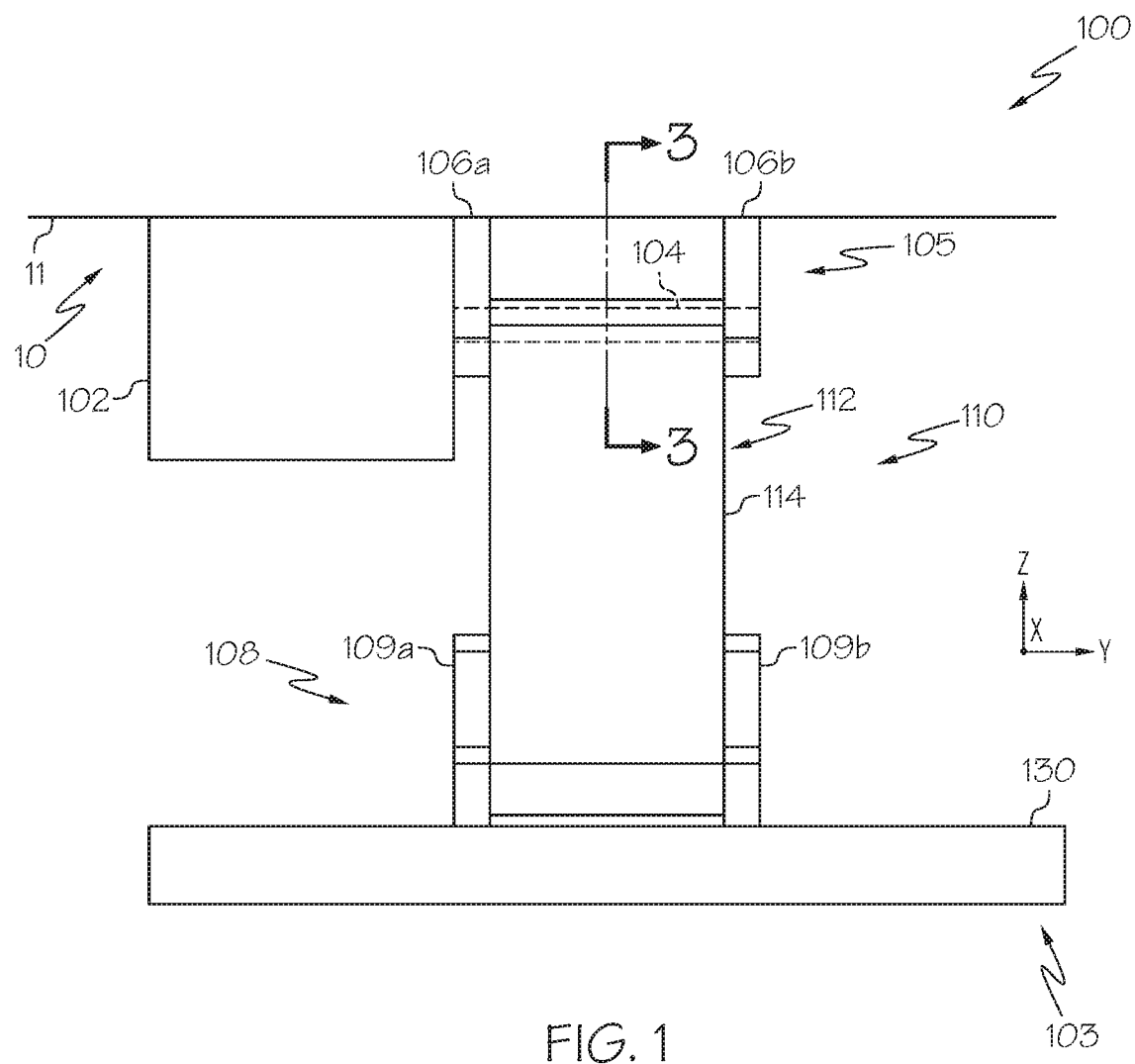
FIG. 1 depicts a view of a retractable vehicle step assembly coupled to a side of a vehicle along the Y-Z plane of the depicted coordinate axes, according to one or more embodiments shown and described herein.

Referring now to FIG. 1, a side view of a portion of a vehicle 10 is illustrated with a retractable vehicle step assembly 100 coupled thereto. It is noted that the vehicle 10 may be any type of passenger vehicle including trucks, utility vehicles, passengers vans, etc. The vehicle 10 may have various entry doors (not shown) or a truck bed. The retractable vehicle step assembly 100 may be positioned to allow access to one or more of these locations to aid a user in achieving access to these portions of the vehicle 10. For example, in some embodiments a retractable vehicle step assembly 100 may be located beneath a door to a passenger cabin (not shown) of the vehicle 10 and/or proximate to the bed of the vehicle 10 in embodiments wherein the vehicle 10 is a truck. In some embodiments, beneath each door may be a dedicated retractable vehicle step assembly 100 for allowing access thereto.

As used herein, the term "vehicle longitudinal direction" refers to the forward-rearward direction of the vehicle 10 (i.e., in the +/− Y-direction of the depicted coordinate axes). The term "vehicle lateral direction" refers to the cross-vehicle direction the vehicle 10 (i.e., in the +/− X-direction of the depicted coordinate axes), and is transverse to the vehicle longitudinal direction. The term "vehicle vertical direction" refers to the upward-downward direction of the vehicle 10 (i.e., in the +/− Z-direction of the depicted coordinate axes).

Figure 2:
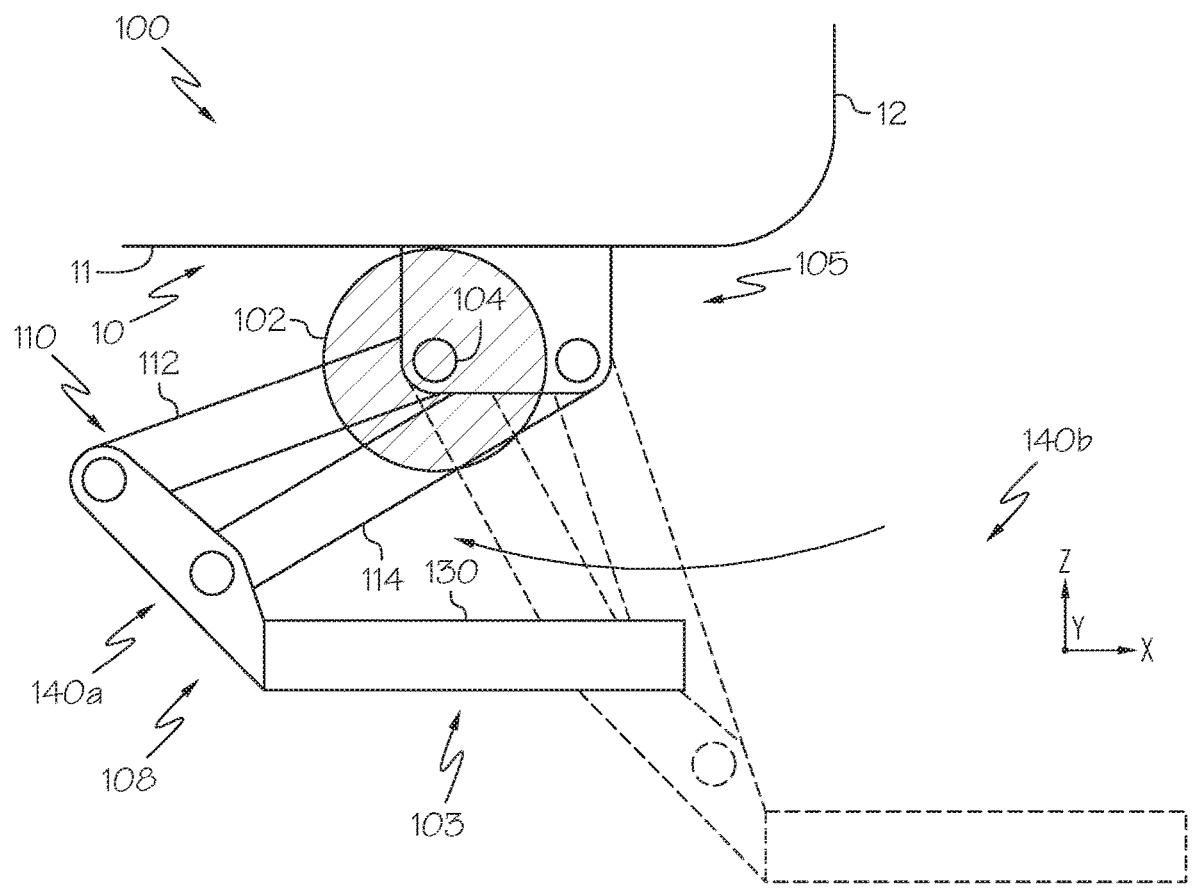
FIG. 2 depicts a view of the retractable vehicle step assembly of FIG. 1 along the X-Z plane of the depicted coordinate axes, according to one or more embodiments shown and described herein.

The retractable vehicle step assembly 100 includes a drive shaft 104 and a step 103 operatively coupled to the drive shaft 104 through a step linkage system 110. The drive shaft 104 may be driven (rotated) by a motor 102 to move the step 103 between a retracted position and an extended position. For example, and as illustrated in FIG. 2, when the motor 102 drives the drive shaft 104 in a clockwise direction, the retractable vehicle step assembly 100 moves to position the step 103 in the retracted positon 140a and when the motor 102 drives the drive shaft 104 in a counterclockwise direction, the retractable vehicle step assembly 100 moves to position the step 103 in an extended position 140b illustrated by dashed lines.

The step 103 may define a platform 130 upon which a user may step to gain access to an area of the vehicle 10. As illustrated, the extended position 140b may position a portion of the platform 130 beyond a side 12 of the vehicle 10 in the vehicle lateral direction. When in the retracted position 140a, the step 103 may be tucked beneath the vehicle 10 in the vehicle vertical direction. For example, in the retracted position 140a at least a portion of the platform 130 may be positioned beneath the vehicle 10 in the vehicle vertical direction. In some cases, the entire step 103 may be tucked beneath the vehicle 10. As illustrated, when in the retracted position 140a the step 103 may be positioned vertically closer to an underside 11 (e.g., to the frame and/or body) the vehicle 10 than when the step 103 is positioned in the extended position 140b.

Figure 3:
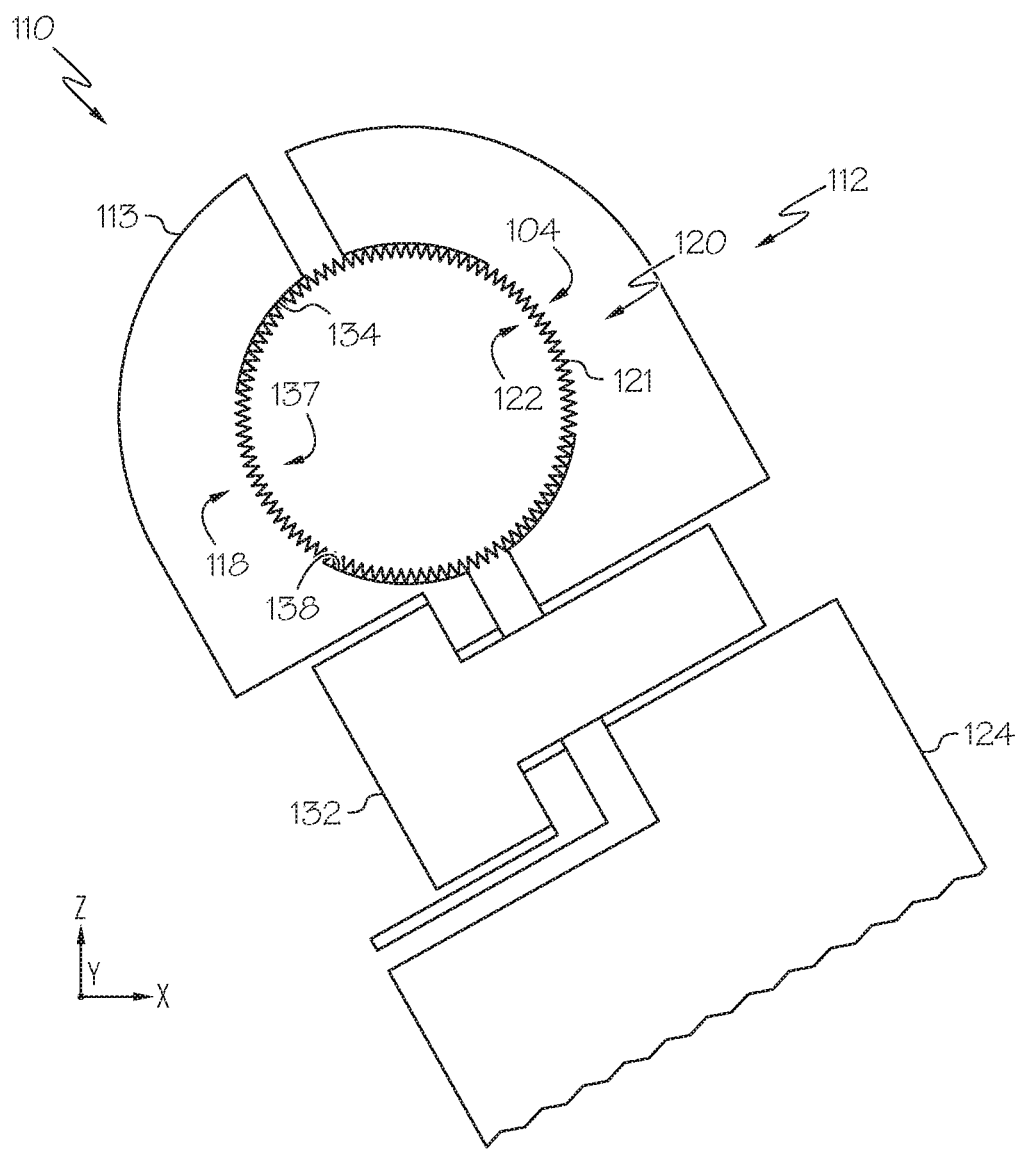
FIG. 3 depicts a detailed view of a step linkage engaged with a drive shaft, according to one or more embodiments shown and described herein.

FIG. 3 illustrates a cross-section of the retractable vehicle step assembly 100 taken along line 3-3 in FIG. 1. Accordingly, a more detailed view of the drive shaft 104 and the step linkage system 110 is illustrated. In the illustrated embodiment, the drive shaft 104 includes a spline 121 extending from a surface of the drive shaft 104. In some embodiments, and as illustrated, the drive shaft 104 may include a plurality of splines 120 formed circumferentially along a cross-sectional perimeter of the drive shaft 104. The plurality of splines 120 may define a trough 122 between each adjacent spline. Each spline may extend along the entire longitudinal length of the drive shaft 104 or along only a portion thereof (e.g., where the step linkage system 110 engages the drive shaft 104). The plurality of splines 120 may include any number of splines (e.g., more than 1, more than two, 4 or more, 5 or more, 10 or more, 20 or more, etc.). As will be described in greater detail herein, the plurality of splines 120 may interlock with the step linkage system 110 such that the rotation of the drive shaft 104 causes the step linkage system 110 to rotate to move the step 103 between the extended position 140b and the retracted position 140a illustrated in FIG. 2.

Referring again to FIG. 1, the step linkage system 110 couples the step 103 to the drive shaft 104. In some embodiments, and as illustrated, the step linkage system 110 also couples the step 103 to the underside 11 (e.g., the frame and/or body) of the vehicle 10 through a vehicle attachment bracket 105. Referring also to FIG. 2, the step linkage system 110 may include a first step linkage 112 and a second step linkage 114. It is noted that in various embodiments, the step linkage system 110 may include the first step linkage 112 and not include the second step linkage 114. That is, in some embodiments, the step linkage system 110 may only include one step linkage. In other embodiments, there may be any number of step linkages.

The first step linkage 112 may couple the step 103 to the drive shaft 104. For example, the step 103 may have a step attachment bracket 108 extending from the platform 130. The step attachment bracket 108 may be rigidly coupled to the platform 130 such that the step attachment bracket 108 is unable to move relative to the platform 130. The first step linkage 112 may be rotatively coupled to the step attachment bracket 108. For example, the first step linkage 112 may be rotatively coupled to the step attachment bracket 108 through a fastener (e.g., a press-fit pin). For example and as illustrated in FIG. 1, the step attachment bracket 108 may include a first step attachment bracket 109a and a second step attachment bracket 109b. The first step linkage 112 (shown in FIG. 2) may be sandwiched between the first step attachment bracket 109a and the second step attachment bracket 109b in the vehicle longitudinal direction. A fastener (e.g., a press-fit pin) may be passed through the first step linkage 112 to rotatively couple the first step linkage 112 to the first step attachment bracket 109a and the second step attachment bracket 109b.

The second step linkage 114 may be similarly coupled to the step attachment bracket 108 at a second location as illustrated in FIG. 2 In some cases the second step linkage 114 may be positioned forward of the first step linkage 112 in the vehicle lateral direction and as illustrated in FIGS. 1 and 2. The second step linkage 114 may be rotatively coupled to the step attachment bracket 108 at one end and, instead of coupled to the drive shaft 104, may be rotatively coupled to the vehicle 10 through the vehicle attachment bracket 105. Similar to the step attachment bracket 108 the vehicle attachment bracket 105 may include a first vehicle attachment bracket 106a and a second vehicle attachment bracket 106b, wherein the second step linkage 114 is sandwiched between the first vehicle attachment bracket 106a and the second vehicle attachment bracket 106b. A fastener (e.g., a press-fit pin) may be passed through the second step linkage 114 and the vehicle attachment bracket 105 (e.g., the first vehicle attachment bracket 106a and the second vehicle attachment bracket 106b) to rotatively couple the second step linkage 114 to the vehicle attachment bracket 105. As will be described below, when the first step linkage 112 is disengaged from the drive shaft 104, the weight of the step 103 may be supported by the engagement between the second step linkage 114 and the vehicle attachment bracket 105.

Referring again to FIG. 3, the first step linkage 112 defines a spline engagement opening 118 for engaging the spline 121 (or the plurality of splines 120) of the drive shaft 104. A fastener 132 may be adjustably coupled to the first step linkage 112 so as to clamp the spline engagement opening 118 around the drive shaft 104. For example, the first step linkage 112 may include an extending portion 124 that extends between the step 103 and the drive shaft 104. A clamping portion 113 may be removably coupled to the extending portion 124 by the fastener 132. When assembled, the extending portion 124 and the clamping portion 113 define the spline engagement opening 118 as illustrated in FIG. 3. When the fastener 132 is removed, as illustrated in FIG. 4, the clamping portion 113 may be removed from the extending portion 124, which allows the first step linkage 112 to be disengaged from the drive shaft 104.

The fastener 132 may be any type of fastener that may be inserted through both the clamping portion 113 and the extending portion 124. For example, the clamping portion 113 and the extending portion 124 may each (or only the extending portion 124) define a threaded opening to allow the fastener 132 (e.g., a threaded fastener), to be removably coupled to both. In other embodiments, the fastener 132 (e.g., a bolt) may pass through both the clamping portion 113 and the extending portion and be fixed in place with a nut. Other fasteners however are contemplated and possible.

Figure 4:
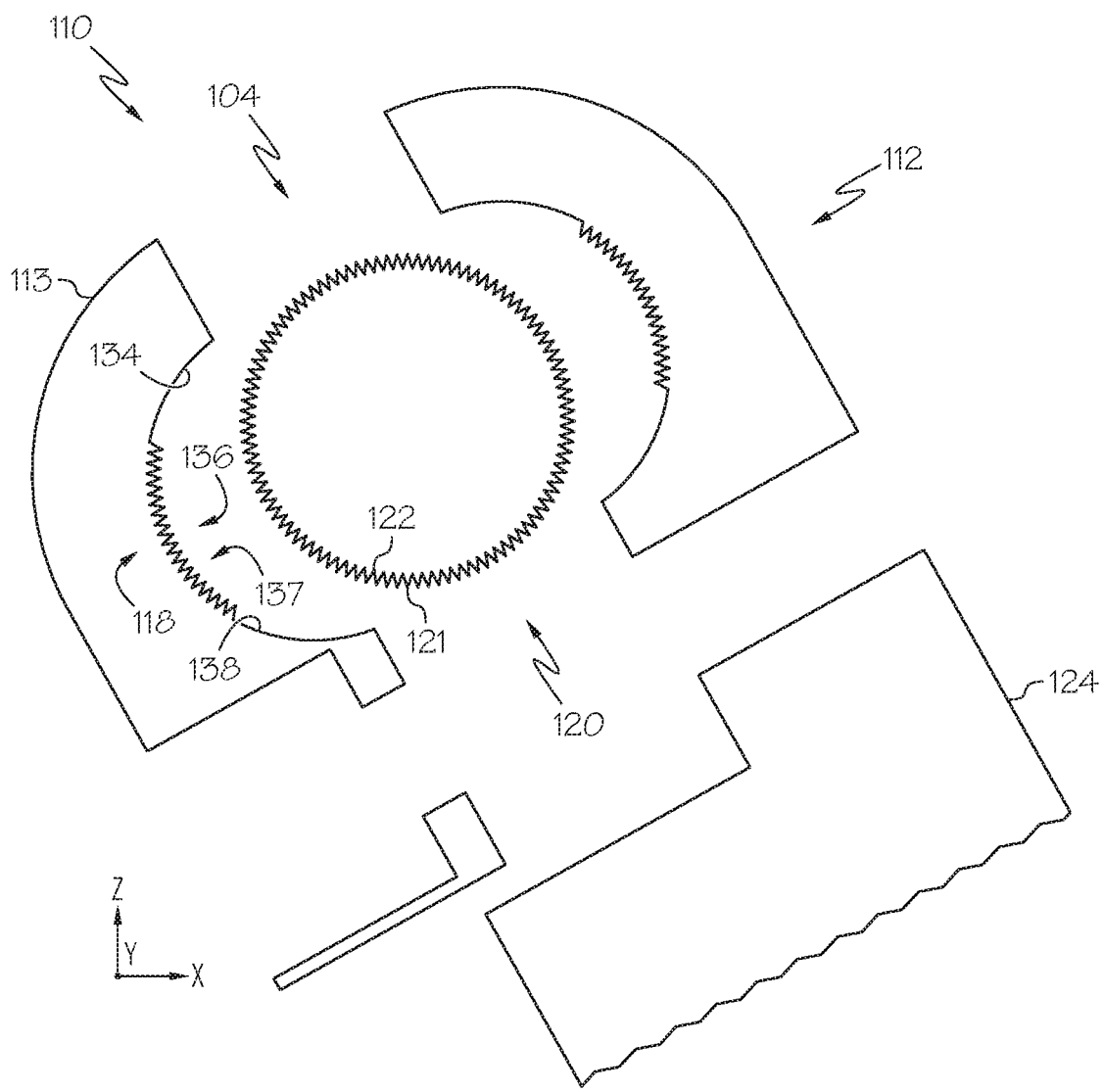
FIG. 4 depicts a detailed view of the step linkage disengaged from the drive shaft of FIG. 3, according to one or more embodiments shown and described herein.

As illustrated in FIGS. 3 and 4, the spline engagement opening 118 has an internal perimeter 134. The internal perimeter 134 may have one or more spline engaging sections 136 that interlock with the plurality of splines 120 of the drive shaft 104 and one or more non-interlocking sections 138. The non-interlocking sections 138 may define a smooth side wall with which the plurality of splines 120 of the drive shaft 104 does not interlock. The combination of non-interlocking sections 138 and spline engaging sections 136 may allow for easier alignment of the drive shaft 104 within the spline engagement opening 118 as the clamping portion 113 is coupled to the extending portion 124.

The spline engaging sections 136 may define a plurality of teeth 137 that extend beyond the wall of the non-interlocking sections 138. When engaged with the drive shaft 104, the teeth 137 may sit within a trough 122 between adjacent splines of the drive shaft 104.

Figure 5:
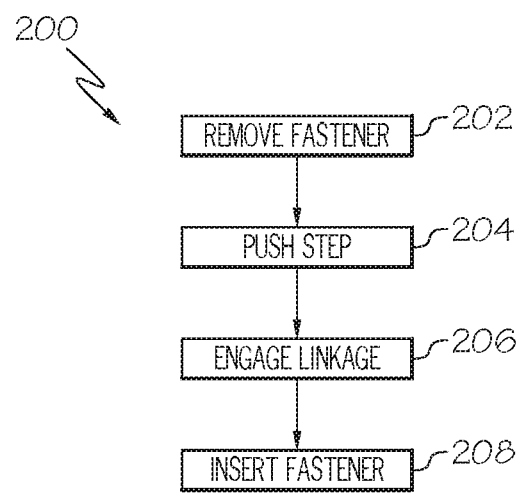
FIG. 5 depicts a flow chart illustrating a method of stowing a retractable vehicle step assembly in a retracted position, according to one or more embodiments shown and described herein.

FIG. 5 illustrates a flowchart 200 depicting a method of stowing the retractable vehicle step assembly 100 in a retracted position 140a. As noted herein, such method may for example be utilized when the motor 102 is not operational to rotate the drive shaft 104. At step 202 the fastener 132 is removed from the first step linkage 112. As noted above, the fastener 132 may couple the clamping portion 113 to the extending portion 124 to define the spline engagement opening 118. When the fastener 132 is removed, the first step linkage 112 may be disengaged from the drive shaft 104 by, for example, removing the clamping portion 113 and lifting the extending portion 124 from engagement with the drive shaft 104. At step 204, the step 103 may then be manually rotated to the retracted position 140a (illustrated in FIG. 2) by pushing the step 103 from the extended position 140b to the retracted position 140a. Motion of the step 103 from the extended position 140b to the retracted position 140a may be supported by the second step linkage 114 coupled to the vehicle attachment bracket 105. Once in the retracted position 140a, at step 206, the user may engage the first step linkage 112 with the drive shaft 104. For example, the user may align the drive shaft 104 the spline engagement opening 118 by repositioning the drive shaft 104 within the extending portion 124 and aligning the clamping portion 113 to enclose the drive shaft 104 within the spline engagement opening 118. At step 208, the user may reinsert the fastener 132 into the first step linkage 112. That is, the fastener 132 may be passed though the clamping portion 113 and the extending portion 124 to fix the clamping portion 113 to the extending portion 124. The splined engagement between the spline engagement opening 118 and the drive shaft 104 may hold the step 103 in the retracted position 140a as illustrated in FIG. 2.

It should now be understood that retractable vehicle step assemblies as described herein may include a drive shaft having a spline and a step coupled to the drive shaft through a step linkage system. The step linkage system may include a first step linkage that may engage the splined shaft so as to interlock with the splined shaft. A fastener may clamp the first step linkage onto the splined drive shaft. When the fastener is removed, the first step linkage may be disengaged from the drive shaft so that the step may be moved to or from a retracted position regardless of the motion of the drive shaft. Accordingly, if the drive shaft were to become inoperable (e.g., due to motor failure) the step may be placed into the retracted (or stowed) position such that the vehicle may travel without concern for any additional clearance needed when the step is extended to an extended position. Moreover, the described assembly may allow for a closer fit between the step and the frame of the vehicle to which it is attached when the assembly is positioned in the retracted position.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A retractable vehicle step assembly comprising:
   a drive shaft comprising a spline; and
   a step coupled to the drive shaft through a step linkage system, the step being moveable between an extended position and a retracted position, wherein the step linkage system comprises:
      a first step linkage defining a spline engagement opening for engagement with the spline of the drive shaft; and
      a fastener adjustably coupled to the first step linkage so as to radially clamp the spline engagement opening around the drive shaft, wherein upon loosening of the fastener the first step linkage is radially disengagable from the drive shaft such that the step is moveable from the extended position to the retracted position regardless of rotation of the drive shaft.

2. The retractable vehicle step assembly of claim 1, wherein the first step linkage comprises an extending portion and a clamping portion that is removable from the extending portion.

3. The retractable vehicle step assembly of claim 2, wherein the extending portion and the clamping portion when assembled define the spline engagement opening.

4. The retractable vehicle step assembly of claim 1, wherein the drive shaft comprises a plurality of splines.

5. The retractable vehicle step assembly of claim 4, wherein an internal perimeter of the spline engagement opening comprises one or more spline engaging sections that interlock with the plurality of splines of the drive shaft and one or more non-interlocking sections.

6. The retractable vehicle step assembly of claim 1 further comprises a motor operatively coupled to the drive shaft to move the step between the extended position and the retracted position.

7. The retractable vehicle step assembly of claim 1, further comprising:
   a step attachment bracket coupled to the step, wherein the first step linkage extends between the step attachment bracket and the drive shaft;
   a vehicle attachment bracket coupled to a vehicle; and a second step linkage rotatably coupled to each of the step attachment bracket and the vehicle attachment bracket.

* * * * *